L. SYKES.
ELECTRICAL HEATING APPLIANCE.
APPLICATION FILED JAN. 31, 1920.

1,406,776.

Patented Feb. 14, 1922.

INVENTOR
Leonard Sykes

By Elwin M. Hulse

ATTORNEY.

UNITED STATES PATENT OFFICE.

LEONARD SYKES, OF FORT WAYNE, INDIANA.

ELECTRICAL HEATING APPLIANCE.

1,406,776.  Specification of Letters Patent.  Patented Feb. 14, 1922.

Application filed January 31, 1920. Serial No. 355,457.

*To all whom it may concern:*

Be it known that I, LEONARD SYKES, a subject of George V, King of Great Britain and Ireland, residing at Fort Wayne, in the county of Allen and State of Indiana, have invented new and useful Improvements in Electrical Heating Appliances, of which the following is a specification.

The invention relates to electrical heating appliances for various uses, and its object is to provide a cheaply and simply constructed appliance in which the heating element is readily removed for repairs or replacement and by which an article may be rapidly and efficiently heated.

Figure 1:
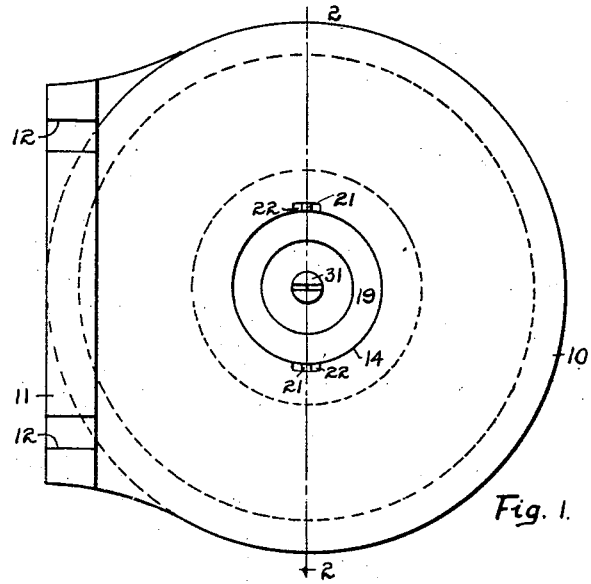
Figure 3:
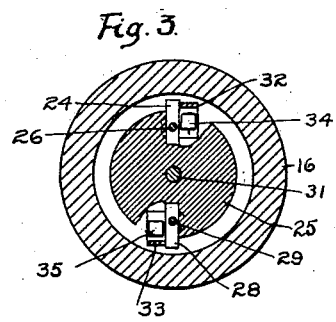
Figure 2:
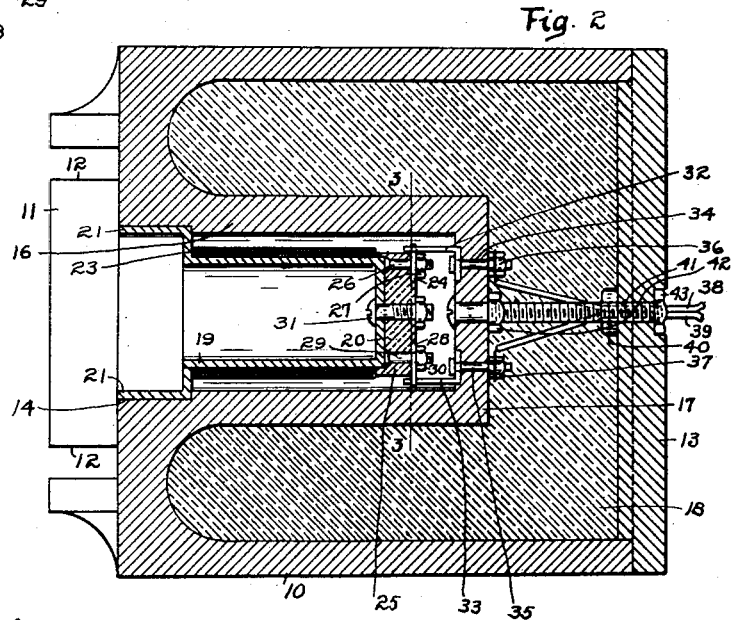
Figure 4:
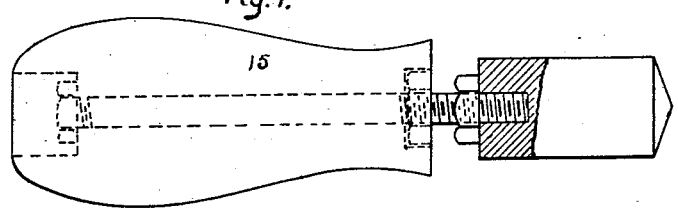

In the accompanying drawings I have illustrated the invention in a form adapted to heat a soldering iron, in which drawings Figure 1 is a front elevational view of an appliance constructed in accordance with the invention; Figure 2 a cross-section of the same on line 2—2 of Figure 1; Figure 3 a cross-section on line 3—3 of Figure 2 and Figure 4 a view of a soldering iron.

Referring to the drawings 10 indicates a shell or casing of suitable material having a laterally projecting flange 11 with apertures 12 therein by which the shell may be supported to a table or other object. In the drawings the shell is cylindrical but it may be formed in any shape and supported in any desired manner. The rear end of the shell is open and normally closed by cover plate 13. An aperture 14 is formed in the front end of the shell, the aperture being of the proper size to permit of the passage therethrough of the article or portion thereof to be heated such as soldering iron 15. A sleeve 16 projects inwardly from the front wall of the shell, the inner diameter of the sleeve being, preferably, not less than the diameter of aperture 14, and the inner end of the sleeve is closed by wall 17 thus forming a cell to contain the heating element. Suitable heat insulating material 18, such as silocel, is inserted in the space between the cell and the shell and cover plate 13 to maintain the temperature of the shell and cover plate at a low point.

The heating element comprises a metallic shell or hollow core 19 having its inner end 20 closed and having at its outer end a sufficient number of forwardly projecting angular members 21 adapted to engage in grooves 22 formed in the front wall of shell 10 and in sleeve 16, and to serve as guides for properly installing the element in the cell and ensuring engagement of the terminals about to be described. The grooves are wider than members 21, hence the shell has limited peripheral movement in the cell. A coil of suitable resistance wire 23 is wound on the exterior surface of the core one end of the coil being connected to contact 24 secured to an insulated block 25 by screw 26 and nut 27 and the other end of the coil being connected to contact 28 secured to block 25 by screw 29 and nut 30, the block being secured to end 20 of core 19 by a suitable number of bolts 31. Contacts 32 and 33 project forwardly from wall 17 of core 18 and are secured to the wall by bolts 34 and 35 and nuts 36 and 37 respectively. Contacts 24 and 28 are adapted to engage contacts 32 and 33 respectively. Circuit wires 38 and 39 are suitably connected to bolts 34 and 35 and extend through a suitable opening in cover plate 13, insulation 40 in the opening protecting the wires from contacting with plate 13. A screw 41 extends through wall 17 of the sleeve and through cover plate 13, nuts 42 and 43 on the screw coacting with wall 17 and cover plate to removably secure the cover plate in position.

The heating element is as readily withdrawn from the cell as it is to disconnect a lamp bulb from its socket. All that it is necessary to do is to turn the core 19 slightly to ensure the separation of contacts 24 and 32 and contacts 28 and 33 and then draw the core forwardly out of the cell, the coil, the block 25 and contacts 24 and 28, of course, coming with it. The coil may then be repaired or removed or rewound without difficulty. The coil will burn out after a certain period of use and the ready and inexpensive repairs thereto are a great advantage gained by my invention.

The heat generated by the coil when supplied with electrical current through wires 38 and 39 causes core 19 to become very hot and with great rapidity and a soldering iron, the point being, usually formed of copper, inserted into the core will rapidly absorb the heat of the core and itself become very rapidly heated.

The invention is adaptable to a variety of uses and I contemplate making use of it in all forms best adapted to heat articles of various kinds.

What I claim is:

1. In an electrical heater, a casing, two terminals supported within the casing, electrical current supply wires connected to the terminals, a hollow member supported in the casing and having one end open and exposed at one side of the casing, two contacts carried by the hollow member and adapted to engage the terminals, a heating element supported on the hollow member and connected at its opposite ends to the contacts, the hollow member, the heating element and the contacts being adapted to be inserted into and withdrawn from the casing as a unit.

2. In an electrical heater, a casing having a cell therein opening exteriorly at one side of the casing, a pair of terminals of an electrical circuit fixed in a wall of the cell, a hollow core in the cell adapted to receive the article to be heated, two contacts carried by the core and adapted to engage the terminals, and a heating element on the core and connected at its opposite ends to the contacts, the core and the heating element and the contacts being adapted to be inserted into or removed from the cell as a unit.

3. In an electrical heater, a casing having a cell therein, a pair of terminals fixed in a wall of the cell, a hollow core removably supported in the cell and opening exteriorly at one side of the casing to admit the article to be heated, two contacts carried by the core, and a heating element wound on the core and connected to the contacts, the contacts being adapted to be engaged on the terminals by rotating the core.

In witness whereof I have hereunto subscribed my name this 27th day of January, 1920.

LEONARD SYKES.